Aug. 12, 1958     L. SLATE     2,847,134
DITCH DIGGING ATTACHMENT FOR TRACTORS
Filed May 31, 1955
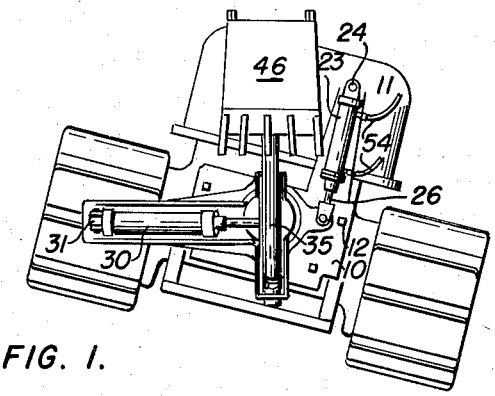
FIG. 1.
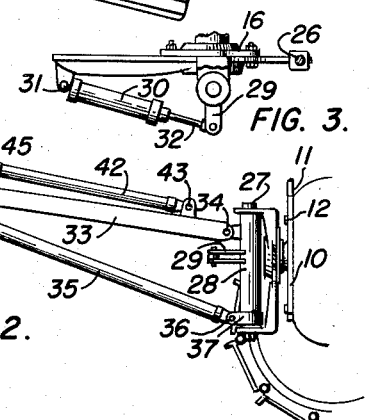
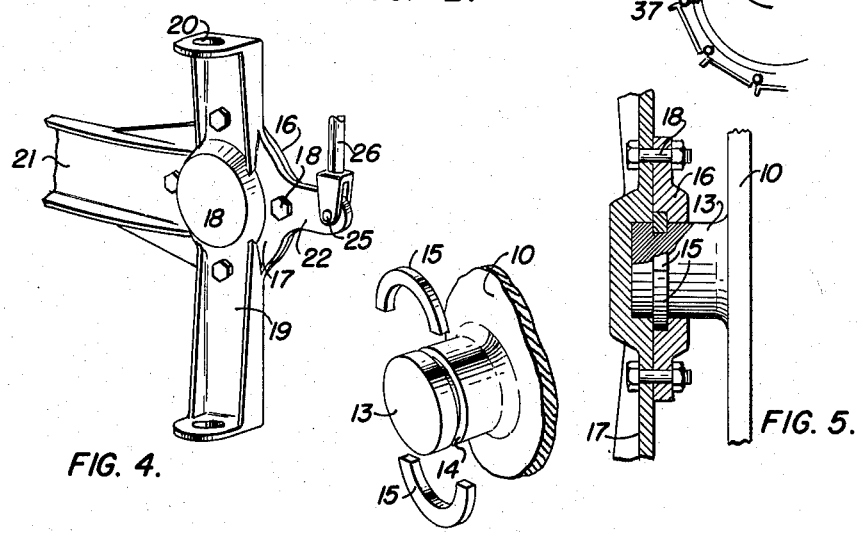
LESLIE SLATE
      INVENTOR.
BY
ATTORNEY

United States Patent Office 2,847,134
Patented Aug. 12, 1958

2,847,134

DITCH DIGGING ATTACHMENT FOR TRACTORS

Leslie Slate, Smithfield, Tex., assignor of one-third to H. J. Whitt and one-third to O. P. Leonard, both of Fort Worth, Tex.

Application May 31, 1955, Serial No. 511,960

2 Claims. (Cl. 214—138)

This invention relates to excavators and has reference to a tractor attached excavating machine constructed to dig vertically in irregular terrain.

In digging ditches for pipelines and the like it is often necessary to traverse the slope of a hill or valley with a vertically walled ditch. Heretofore it has been a general practice to use bull dozers or maintainers to cut away part of the slope in preparation of a laterally horizontal surface from which mechanical ditch diggers could make the required excavation; without this preparation mechanical ditch diggers known heretofore were disposed to dig angularly into the side of a slope making a ditch which is crooked at its base and unacceptable for the laying of pipe. In rough and irregular areas the cost of preparing a laterally horizontal working surface frequently exceeds the cost of making the ditch itself. Other forms of excavation from sloping surfaces present similar problems of both economical and mechanical nature.

An important object of the invention is to provide an excavating machine suitable for making vertical excavations from sloping or irregular working surfaces.

A further object of the invention is to provide a tractor attached excavating machine wherein the angle of attack of the digging implement may be regulated independently with respect to the position of the tractor.

A further object of the invention is to provide an excavating machine of the type described which is easily detachable from the tractor and which may be mounted thereto without major alterations.

A further object of the invention is to provide a tractor mounted excavating machine of the type described which may be powered and controlled by the hydraulic system of the tractor.

These and other objects will become apparent from the following description and the accompanying drawings, wherein:

Figure 1 is a rear view of a tractor with the excavating machine attached thereto illustrating the manner in which the digging implement may be independently aligned with respect to the position of the tractor.

Figure 2 is a side elevational view of the invention as described herein shown attached to the rear of a tractor.

Figure 3 is a fragmentary plan view of the mounting bracket and its appurtenant components.

Figure 4 is a fragmentary perspective view of a mounting bracket.

Figure 5 is a partially sectional side elevational view of a mounting bracket and a mounting plate pivotally attached to a mounting shaft.

Figure 6 is a perspective view of the mounting shaft showing the arrangement of half rings for rotatably securing the mounting brackets in place.

In the drawing, a mounting plate 10 in substantially rectangular shape with an arm 11 extending upward from an upper corner thereof is mounted in a vertical plane to the structural frame at the rear of a tractor with bolts 12. An integral stub shaft 13 projects from the mounting plate 10 near its center and extends perpendicularly therefrom. A groove 14 in the cylindrical surface of the stub shaft 13 is made to receive corresponding semi-circular retaining rings 15 which have exterior arcuate surfaces of sufficient diameter to project beyond the arcuate surface of the shaft 13 when the rings 15 are placed within the groove 14. A locking plate 16 of substantially circular shape provided with a bearing opening through its center corresponding with the diameter of the shaft 13 and provided with a circular recess rearward of the opening corresponding with the outer diameter of the rings 15 is positioned about the stub shaft 13 forward of the rings 15 and rearward of the mounting plate 10. A mounting bracket 17 is provided with a cylindrical recess corresponding to the diameter of the shaft 13 into which the projecting end of the shaft is journaled whereby a portion of the mounting bracket 17 is in contact with the rear surface of the rings 15 and whereby the projecting end of the shaft 13 is at all adjacent points in contact with the walls of said cylindrical recess. Bolts 18 fasten the mounting bracket 17 to the locking plate 16 against the retaining rings 15 preventing longitudinal motion of the mounting bracket 17 upon the shaft 13. Normally vertically bearing arms 19 project above and below the stub shaft 13 from the mounting bracket 17 as integral parts thereof, each arm 19 being provided at its projecting end with a rearward directed flanged portion and reinforcing members therefor. Aligned bearing openings 20 are provided through the flanged portions of the bearing arms 19. Projecting from the mounting bracket 17 perpendicular to the bearing arms 19 is a cylinder supporting member 21, and projecting from the mounting bracket opposite the supporting member 21 is a bracket arm 22. A conventional double acting hydraulic actuator 23, hereinafter referred to as the bracket actuator, is pivotally mounted at the base of its cylinder 24 to the extended end of the arm 11 projecting upward from the mounting plate 10 and is pivotally attached at the end of its piston rod 26 to the extended end of the bracket arm 22. Journaled through the bearings 20 are opposite ends 27 of a normally vertical shaft 28, the ends 27 being somewhat smaller in diameter than the shaft itself so that the body of the shaft is confined between the bearings 20 and is free to turn in a normally horizontal plane of rotation. Ears 29 project from the vertical shaft 28 near the midpoint of its length and a conventional double acting hydraulic actuator 30, hereinafter referred to as the shaft actuator, is pivotally mounted at the base of its cylinder 31 to the extended end of the cylinder support 21 and is pivotally attached at the end of the piston rod 32 to the ears 29. A boom 33 constructed from I-beam or other suitable bar or tubular stock is pivotally mounted in a vertical plane of rotation to a boom supporting member 34 affixed to the shaft 28 at a position thereon above and parallel with the ears 29. A conventional double acting hydraulic actuator 35, hereinafter referred to as the boom actuator, is pivotally mounted at the base of its cylinder 36 to a clamp 37 secured tightly about the shaft 28 at a point below the ears 29; the end 38 of the boom actuator piston rod 39 is pivotally attached to the boom 33. A dipper stick 40 is pivotally attached in a normally vertical plane of rotation to the extended end 41 of the boom 33. A conventional double acting hydraulic actuator 42, hereinafter referred to as the dipper stick actuator, is pivotally mounted in a normally vertical plane of rotation at the base of its cylinder 43 to the boom 33 and is pivotally attached at the end 44 of its piston rod 45 to the adjacent end of the dipper stick 40. A back hoe bucket is equipped with teeth 47 suitable for excavation and with a triangular frame member 48 attached to the bucket 46 at its side opposite the teeth 47. The triangular frame member 48 is pivotally attached in a normally vertical plane of rotation at a point 49 near the open face of the bucket 46 to the working end of the dipper stick 40. A conventional double acting hydraulic actuator 50, hereinafter referred to as the bucket actuator, is pivotally mounted at the base of its cylinder 51 to the dipper stick 40 and is pivotally attached at the end 52 of its piston rod 53 to the extending corner of the triangular frame member 48.

Conventional hydraulic fluid lines as in 54, hydraulic pump, valves and valve rack (not shown) are provided to energize and control the hydraulic actuators in the usual manner familiar to those versed in the art. On tractors equipped with hydraulic systems the existing pumps may be utilized to provide power for the machine herein described.

In operation, the invention may be attached to a tractor by bolting the mounting plate 10 to the structural frame at the rear of the tractor and by bolting the locking plate 16 to the mounting bracket 17 at opposite sides of the rings 15 about the stub shaft 13. With the bucket 46, dipper stick 40, and boom 33, elevated from the ground the unit is transported to the working site by the motive power of the tractor. By manipulation of valves, the operator may cause the various actuators to be energized. By extending or withdrawing the piston of the bracket actuator 23, the mounting bracket may be laterally rotated in a vertical plane about the stub shaft 13, thus providing vertical alignment for the boom 33, dipper stick 40 and bucket 46 when the tractor is angularly positioned as on the side of a hill. The shaft actuator 30 causes the shaft to be rotated either clockwise or counterclockwise in a normally horizontal plane of rotation providing thereby a means for moving the bucket 46 laterally for purposes such as dumping or loading. Extension of the piston within the boom actuator 35 raises the boom 33 and provides a means for controlling the depth of cut and the distance of work from the machine; withdrawal of the piston lowers the boom. The dipper stick actuator provides force for digging and may be used to place or release excavated material from the bucket. The bucket actuator may be used to perform such operations as biting or scratching with the bucket.

The invention is not limited to the exemplary construction herein shown and described, but may be made in various ways within the scope of the appended claims.

What is claimed is:
1. An excavating machine for attachment to a tractor, said machine comprising a vertical mounting plate adapted to be mounted on said tractor, a horizontal stub shaft extending from said mounting plate, said stub shaft including a groove therearound, a retaining ring in said groove, a mounting bracket journalled on said stub shaft, a locking plate secured to said mounting bracket and engaging said retaining ring, normally vertical bearing arms on opposite sides of said mounting bracket, a normally vertical shaft journalled on said bearing arms, a boom pivotally connected with said normally vertical shaft, an actuator pivotally connected with said normally vertical shaft and with said boom, a digging implement pivotally attached to said boom, means carried by said boom actuating said digging implement, and means rotatably actuating said mounting bracket on said stub shaft.

2. An excavating machine for attachment to a tractor, said machine comprising a horizontal mounting shaft projecting said tractor, a mounting bracket journalled on said shaft for rotation about the axis thereof, a normally vertical shaft pivotally mounted on said bracket, means rotating said bracket on said shaft, means rotating said normally vertical shaft on said bracket, a boom pivotally attached to said normally vertical shaft, means actuating said boom about its pivotal connection, a digging implement pivotally attached to said boom, means actuating said digging implement about its pivotal attachment, a retaining ring around said mounting shaft, and a locking plate positioned around said mounting shaft, said locking plate being secured to said mounting bracket.

References Cited in the file of this patent

UNITED STATES PATENTS

| Re. 23,989 | Wills et al. | Apr. 26, 1955 |
| 2,305,566 | Weston et al. | Dec. 15, 1942 |
| 2,666,376 | Pursche | Jan. 19, 1954 |
| 2,702,137 | Ives | Feb. 15, 1955 |

OTHER REFERENCES

"Gradall Construction Machine," publication of Warner & Swasey Co., Cleveland, Ohio, Form 4903.

"Wagner Model WSL Swing Loader," publication of Wagner Iron Works, Milwaukee 1, Wis., Form No. 1093.